United States Patent [19]

Shaffer et al.

[11] Patent Number: 5,227,266
[45] Date of Patent: Jul. 13, 1993

[54] SEALED LEAD-ACID CELL HAVING A NOVEL LUG, AND END COVER ASSEMBLY

[75] Inventors: David M. Shaffer, Glen Ellyn; Joseph J. Jergl, Bolingbrook, both of Ill.

[73] Assignee: GNB Industrial Battery Company, Lombard, Ill.

[21] Appl. No.: 803,349

[22] Filed: Dec. 4, 1991

[51] Int. Cl.⁵ .......................................... H01M 2/22
[52] U.S. Cl. ................................... 429/160; 429/161; 429/177; 429/179
[58] Field of Search ................ 429/160, 161, 153, 158, 429/53, 55, 177, 179, 211, 245, 204, 252, 225; 29/623.1

[56] References Cited

U.S. PATENT DOCUMENTS

| 644,144 | 2/1900 | Osburn . |
|---|---|---|
| 2,052,499 | 8/1936 | Strough . |
| 2,242,599 | 5/1941 | Raney . |
| 2,618,673 | 11/1952 | Shannon et al. . |
| 2,702,829 | 2/1955 | Chapel . |
| 3,253,959 | 5/1966 | Jones . |
| 3,396,056 | 8/1968 | Gonnard . |
| 3,600,233 | 8/1971 | Coffey et al. . |
| 3,764,386 | 10/1973 | Mix . |
| 3,841,915 | 10/1974 | Eberle . |
| 3,915,751 | 10/1975 | Sanekata et al. . |
| 3,933,522 | 1/1976 | Steig . |
| 3,988,169 | 10/1976 | McLean . |
| 4,138,533 | 2/1979 | Steig . |
| 4,143,215 | 3/1979 | Mocas . |
| 4,160,071 | 7/1979 | Parker . |
| 4,221,852 | 9/1980 | Qureshi . |
| 4,309,492 | 1/1982 | Bernard . |
| 4,320,183 | 3/1982 | Qureshi . |
| 4,371,597 | 2/1983 | Ikeda et al. . |
| 4,376,156 | 3/1983 | Wheadon . |
| 4,477,546 | 10/1984 | Wheeler et al. . |
| 4,645,725 | 2/1987 | Kump et al. . |
| 4,683,180 | 7/1987 | Bish et al. . |
| 4,764,182 | 8/1988 | Bish et al. . |
| 4,898,796 | 2/1990 | Furukawa et al. . |

FOREIGN PATENT DOCUMENTS

| 268586 | 12/1964 | Australia . |
|---|---|---|
| 790601 | 11/1935 | France . |
| 56-18367 | 2/1981 | Japan . |
| 59-81865 | 5/1984 | Japan . |
| 60-65455 | 4/1985 | Japan . |
| 60-200457 | 10/1985 | Japan . |
| 1324426 | 12/1919 | United Kingdom . |
| 1007497 | 10/1965 | United Kingdom . |
| 1312402 | 4/1973 | United Kingdom . |
| 1481454 | 7/1977 | United Kingdom . |
| 2127614 | 4/1984 | United Kingdom . |

OTHER PUBLICATIONS

Drawing Dec. 24, 1900, Aytron.

Primary Examiner—Anthony Skapars
Attorney, Agent, or Firm—Leydig, Voit & Mayer

[57] ABSTRACT

A sealed lead-acid cell includes a container, a plurality of positive and negative plates alternately interleaved with one another and disposed to opposite ends of the container, primary end cover in sealing engagement with the container which includes electrically conductive means for electrically coupling the lugs of like polarity plates and which is in electrical communication with a terminal post.

47 Claims, 6 Drawing Sheets

SEALED LEAD-ACID CELL HAVING A NOVEL LUG, AND END COVER ASSEMBLY

BACKGROUND OF THE INVENTION

1. Field of the Invention

This invention relates to lead-acid cells and, more particularly, to sealed, maintenance-free, lead-acid cells suitable for use in rapid recharging applications.

2. Description of the Prior Art

Sealed lead-acid stationary batteries are widely used in commerce today. Stationary batteries are specifically designed for float applications, that is, as standby power in the event of a power failure. Stationary batteries are maintained at a full state-of-charge and in a ready to use condition, typically by floating at a constant preset voltage. Stationary batteries are used for standby or operational power in a wide variety of applications, including, by way of illustration, in telecommunications, utilities, for emergency lighting in commercial buildings, as standby power for cable television systems and in uninterruptible power supplies.

The sealed lead-acid stationary batteries used for industrial applications where the power requirements are high and quite demanding are typically comprised of from several to a large number of individual sealed lead-acid cells connected to one another to form a battery with the desired capacity and power requirements. The individual sealed lead-acid cells may be connected in series, in parallel or in suitable combinations of series and parallel to form a battery with the desired capacity and power requirements. External connections are typically made between the negative and positive terminal posts of the respective cells.

In presently available sealed lead-acid cells, both the positive and the negative terminals are located at the same end of the cell. Accordingly, in order to externally connect a plurality of cells to form a battery, intercell connections of varying length are required, whether the cells are connected in series, in parallel, or in some combination of series and parallel. Because of the different lengths of the intercell connectors, the resistance across the connectors will vary. It would be beneficial to be able to connect a plurality of sealed lead-acid cells with a uniform size intercell connector for expediency, efficiency and economy in arranging and assembling the cells into a battery and to minimize the resistance of both the intercell connection and the battery.

The sealed lead-acid cells that comprise the stationary batteries employed in large industrial applications are typically quite large and require substantial space merely to accommodate the battery. The enormous size of such batteries is due in large measure to the large physical size of the individual cells which comprise the battery and the large number of cells that are typically needed to construct a battery having the required capacity and power requirements. It would be desirable to provide sealed lead-acid cells having a greater energy density and greater capacity per unit volume than presently available sealed lead-acid cells to reduce the number of cells required to supply the requisite power and to reduce the overall space requirements of the battery.

When stationary batteries are put into service, as, for example, when there is a power interruption, the batteries are often subjected to a heavy load, and thus, rapidly discharge. When the battery is placed on discharge, the voltage of the battery initially drops abruptly due largely to the resistance of the battery. As the discharge proceeds, the rate at which the voltage decreases is slower due to the fact that the reactive materials in the battery, i.e., the active materials in the plates and the sulfuric acid are reacting. Toward the end of discharge, the voltage falls more abruptly as the sulfuric acid of the electrolyte and/or the active materials on the plates become depleted so that they can no longer support the rate of discharge. When the battery and thus cells are placed on a high rate of discharge, as for example when large current is required in the event of a power outage and the battery is engaged to supply the requisite power, the resistance is important to the overall performance of the battery.

According to Ohm's Law, the total voltage drop on discharge includes both the voltage drop across the terminals of the appliance to be powered and the internal resistance of the battery. For stationary batteries comprised of a plurality of cells, the internal resistance of the battery is the combined resistance attributed to the internal resistance of the individual cells and the resistance across the intercell connectors. The power loss of the cells (and thus of the battery) increases with the square of the current. Resistance is expended in heating the cells and battery, and is lost. Particularly, then, at high rates of discharge, the watt-efficiency of the battery is reduced, and the useful power that the battery can give is limited.

It would be desirable, therefore, to provide sealed, lead-acid cells suitable for use in stationary batteries, capable of enduring deep discharge and rapid recharging and having a long cycle life, increased capacity, and reduced combined resistance. It would also be desirable to provide such cells which can be connected together to form a battery with a minimum and uniform-sized intercell connector to minimize resistance in the intercell connection.

Accordingly, a principal object of the present invention is to provide a sealed lead-acid cell capable of enduring deep discharge and rapid recharging, having a long cycle life and which is suitable for use in stationary batteries.

It is a further object of the present invention to improve the energy density of a sealed lead-acid cell. It is a related object to reduce the internal resistance of such a cell. It is a further object of the present invention to provide a cell in which the head space is reduced and taller plates can be used for a cell of predetermined size.

Yet another object of the present invention is to provide a sealed lead-acid cell which, when assembled into a battery, has reduced space requirements. It is a more specific object of the present invention to provide a sealed lead-acid cell that is physically smaller than currently known sealed lead-acid cells of comparable capacity.

It is another object to provide a sealed lead-acid cell which provides for a relatively direct current path for the removal of current from the cell. It is a related object to provide a cell in which the current path from the plate lugs to the post is relatively short for both the positive and negative plates. It is another, more specific, object of the invention to provide a direct current path from the lugs to the terminal post, and to eliminate the strap, post and post burn.

It is another object of the present invention to provide a sealed lead-acid cell in which the positive and negative terminals are disposed at opposite ends of the cells. It is a related object of the invention to improve the utilization of the electrode active material of the positive and negative plates. It is a more specific object to improve the utilization of electrode active material over the total area of the plates.

It is also an object of the present invention to provide sealed lead-acid cells which are capable of being connected either in series, or in parallel, or in a combination of series and parallel with a uniform-sized intercell connector. A related object is to provide a battery comprised of a plurality of sealed lead-acid cells in which the length of the intercell connector is minimized.

A further object of the present invention is to provide a sealed lead-acid cell which includes means for pre-aligning the plate lugs before the plate lugs are electrically coupled. It is a related object to provide pre-aligning plate lug means which is capable of preventing lead run-down into the plates.

It is a more specific object of the present invention to provide a high power density, sealed lead-acid recombinant cell.

These and other objects and advantages of the present invention will be apparent from the following description and drawings.

SUMMARY OF THE INVENTION

The present invention provides a sealed lead-acid cell suitable for stationary batteries, capable of enduring deep discharge and rapid recharging, having a long cycle life, and having reduced internal resistance, and increased capacity; and to multi-cell electric storage batteries made from a plurality of such sealed lead-acid cells.

In one aspect, the present invention provides a sealed lead-acid cell comprising a container with two opposite ends and a plurality of positive and negative polarity plates interleaved alternately with one another in the container. Each of the positive polarity plates and negative polarity plates comprises a grid which includes at least one lug thereon for electrical connection to means for electrically coupling plates of like polarity. The lugs of the positive polarity plates and of the negative polarity plates are arranged so that they face toward opposite ends of the housing. The cell is sealed on both ends with a cover assembly which comprises a primary end cover and optionally a secondary end cover. The primary end cover for each end of the container is in sealing engagement with the container. Each of the primary end covers includes electrically conductive means for electrically coupling the lugs of like polarity plates. The electrically conductive means is also in electrical communication with the terminal post for the respective polarity plates. A secondary end cover may be in engagement with the primary end cover. The secondary end cover covers the electrically conductive means and has an aperture therein through which the terminal post extends for external electrical connection.

In the sealed lead-acid cells in accordance with the present invention, the current path from the plate lugs to the terminal post is directly through electrically conductive means in the primary cover and is relatively short for both the positive and negative polarity plates. The internal resistance within the cell is thus reduced and the capacity of the cell is increased. The inclusion of the electrically conductive means in the primary end cover permits the plate lugs to be electrically coupled directly to the electrically conductive means and thus reduces the head space required in the cell. Taller plates and thus more active material may be used for a cell container of a predetermined size to thereby provide cells with greater capacity. Moreover, the direct current path from the lugs to the terminal post through the electrically conductive means eliminates the strap, post and post burn. Additionally, because the positive and negative plates in the cell face opposite ends of the cell container, utilization of the total area of active material on the plates is improved. The cells may be constructed of uniform size and because the positive and negative terminal posts are on opposite ends of the cells, two or more cells may be connected together with a uniform sized intercell connector to form a battery. Use of a relatively short, uniform-sized intercell connector reduces the resistance in the intercell connections thereby improving the capacity of the battery.

In another aspect, the present invention provides a sealed lead-acid battery comprised of at least two sealed lead-acid cells as described herein.

DETAILED DESCRIPTION OF THE INVENTION

While the present invention is susceptible to various modifications and alternative forms, the preferred embodiments are illustrated in the drawings and will be described in detail. It is to be understood, however, that it is not intended to limit the invention to the preferred embodiments. On the contrary, it is intended to cover all modifications and alternative forms falling within the spirit and scope of the invention as expressed in the appended claims.

In general, the present invention provides a sealed lead-acid cell comprising a novel cell geometry which includes a novel lug, post and end cover assembly which provides a cell having reduced internal resistance and greater capacity. In accordance with the invention, the positive polarity plates and negative polarity plates are included in the cell so that the lugs of like polarity plates are disposed toward opposite ends of the cell container. The ends of the container each are sealed with a primary end cover in sealing engagement with the ends of the cell container. The primary end covers each include electrically conductive means for electrically coupling the positive and negative polarity plates, respectively, and a terminal post in electrical communication with the electrically conductive means. In one operation, the lugs of the plates are electrically coupled to the terminal post through their electrical coupling with the electrically conductive means. Straps and posts are thus eliminated with the electrically conductive means in accordance with the invention. Secondary end covers may be included in engagement with the primary end covers to enclose the electrically conductive means. The secondary end covers each include an aperture therein for receiving the terminal post thereby allowing the terminal post to be available for external electrical connection.

Figure 1:
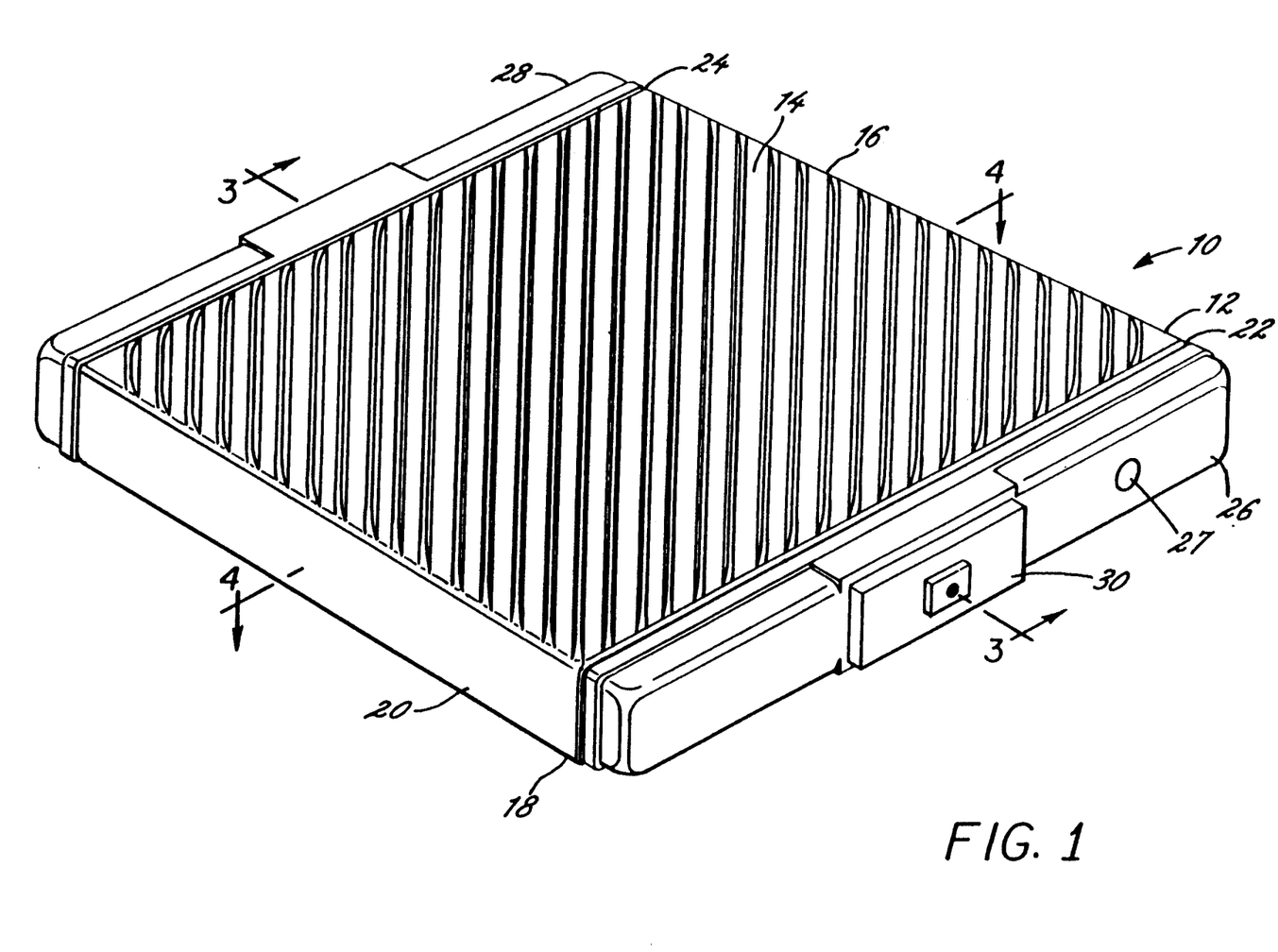
FIG. 1 is a perspective view of a cell in accordance with the present invention in assembled condition.
Figure 2:
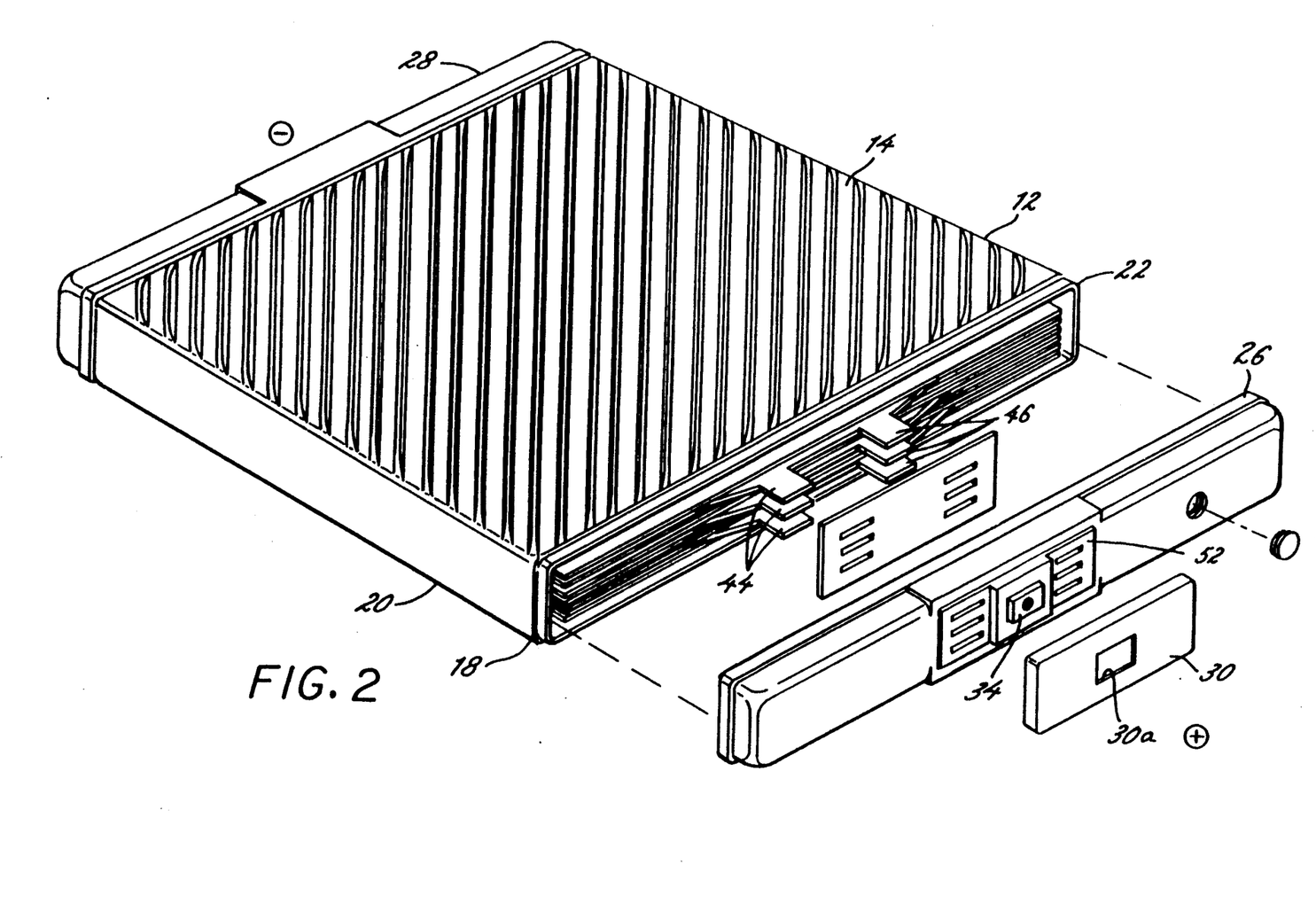
FIG. 2 is a perspective view of a cell in accordance with the present invention with one end in exploded perspective showing the end assembly.
Figure 3:
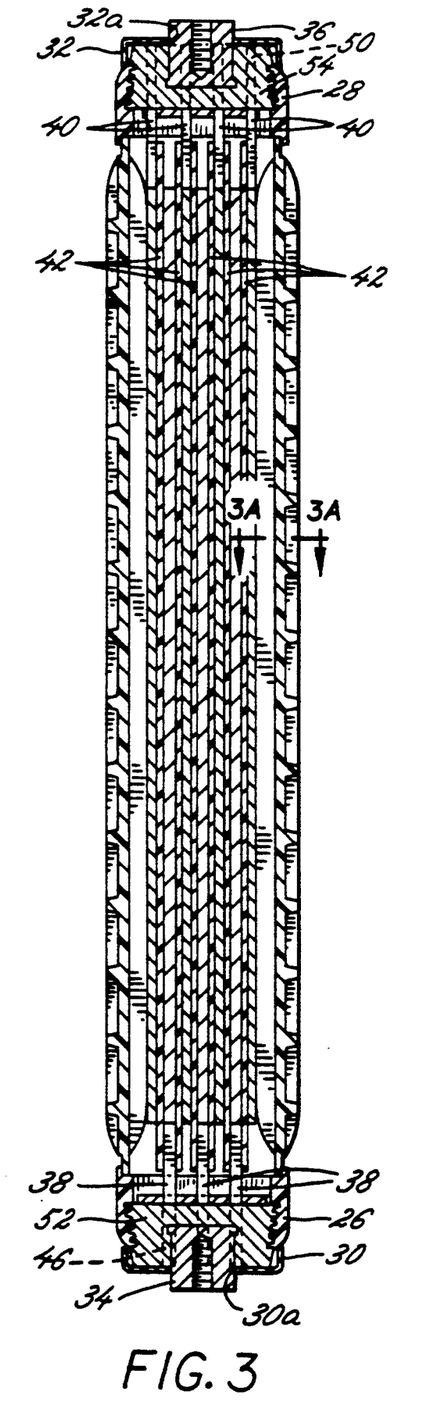
FIG. 3 is a sectional view of a cell in accordance with the present invention taken along line 3—3 of FIG. 1.
Figure 4:
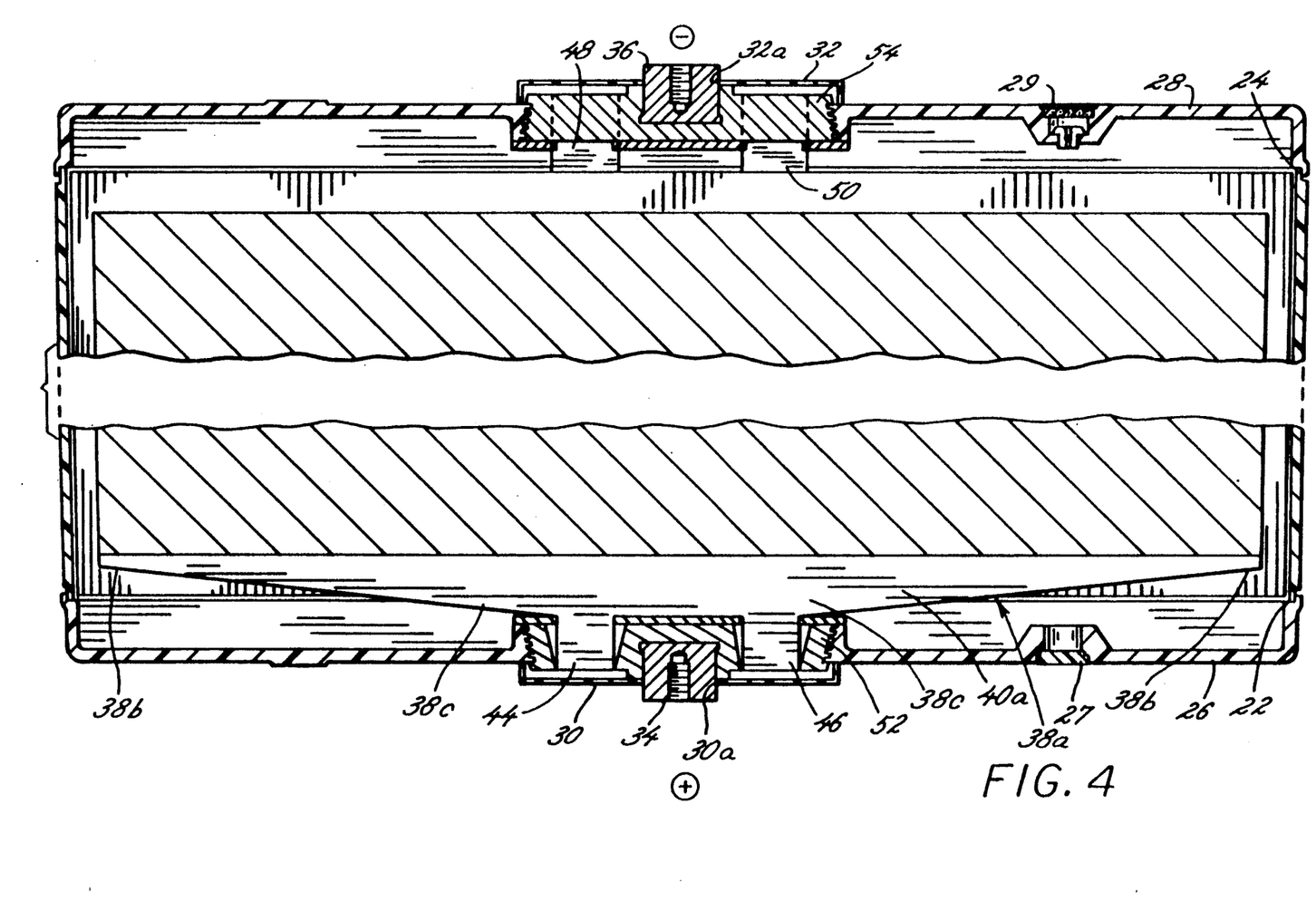
FIG. 4 is a sectional view of the cell illustrated in FIG. 1 and taken along line 4—4 of FIG. 1.

Turning to FIGS. 1 and 2, there is illustrated a cell 10 made in accordance with the present invention. In the illustrated embodiment, cell 10 comprises a container 12 having four sides 14, 16, 18 and 20 and two ends, 22 and 24. Ends 22 and 24 are each covered with primary end cover 26, 28, as shown in FIGS. 3 and 4, in sealing engagement with ends 22, 24, respectively, of container 12. As illustrated, primary end cover 26 is for the positive polarity plates, and primary end cover 28 is for the negative polarity plates. Primary end cover 26 may include an electrolyte fill hole 27 through which electrolyte may be added to form the cell. Primary end cover 28 may, and preferably does, include a vent release valve 29 (as seen in FIG. 4) for venting gases that may build up in the cell during use. The vent release valve is preferably set to a predetermined pressure before it will release. The predetermined venting pressure may be varied depending on a number of factors, including the strength of the container employed. It is contemplated that a venting pressure on the order of from about 2 to about 5 psi may be used for containers made of thermoplastic materials, although it will be recognized that the venting pressure may be varied as a matter of design choice.

As illustrated in FIGS. 2 and 3, secondary end covers 30, 32 engage primary end covers 26, 28. The secondary end covers may be snap fit into the primary end covers, or they may be sealed to the primary end cover, or the like. Secondary covers 30, 32 each have an aperture 30a, 32a therein for receiving terminal posts 34, 36. Terminal posts 34, 36 extend through apertures 30a, 32a for external electrical connections.

As can be seen in FIG. 3, cell 10 comprises a plurality of positive plates 38 interleaved with a plurality of negative plates 40 and separated by appropriate separators 42 in between the positive and negative plates. The number of positive plates and negative plates may be equal, the number of positive plates may exceed the number of negative plates by one so that a positive plate will be on both sides of the plate stack, or the number of negative plates in the cell may be one greater than the number of positive plates in the cell so that a negative plate will be on both ends of the plate stack. The plates 38 and 40 comprise an active material (not shown) on a conductive substrate.

In the illustrated embodiment of the present invention, as shown in FIG. 4, positive plates 38 include a pair of plate lugs 44, 46 which extend from the plate and negative plates 40 include a pair of plate lugs 48, 50 which also extend from the plate. It will be understood, however, that other configurations could be used. For example, either or both the positive and negative plates may include one lug, or they may include more than two lugs.

In addition, it is preferred that the negative plates and the positive plates have the geometry as illustrated for the positive plates 38 shown in FIG. 4. It is preferred that the positive plates 38 include a tapered top portion 38a that is shallowest at the edges 38b of the plates and deepest at the central portion 38c of the plates in the proximity of lugs 44, 46. It is also preferred that the negative plates 40 include a tapered top portion that is shallowest at the edges of the plates and is deepest at the central portion of the plates in the proximity of lugs 48, 50. The tapered top portion of the plates assists in the collection of current from the plates. The precise geometry of the tapered top portion may be varied depending on a number of design factors, such as the number of lugs used, the capacity of the plates and the like.

In keeping with the invention, as shown in FIGS. 3 and 4, the positive plates 38 and negative plates 40 are disposed in container 12 so that lugs 44, 46 of positive plates 38 face one end 22 of container 12, and lugs 48, 50 of negative plates 40 face another, preferably opposite end 24 of container 12. In the illustrated embodiment, container 12 is symmetrical about its longitudinal and transverse axes, however, it need not be. It will also be appreciated that the designations of the ends as positive and negative are purely arbitrary and may be reversed without departing from the invention.

As shown in detail in FIGS. 2, 3 and 4, primary end cover 26 includes electrically conductive means 52 for electrically coupling plate lugs 44, 46 of positive polarity plates 38. As shown in FIGS. 3 and 4, primary end cover 28 similarly includes electrically conductive means 54 for electrically coupling plate lugs 48, 50 of negative polarity plates 40. Electrically conductive means 52, 54 may be and preferably are, pre-cast, and further they are preferably pre-assembled and embedded into primary end covers 26, 28, respectively. In the preferred embodiment of the invention, the sides of electrically conductive means 52, 54 are embedded into covers 26, 28 for sealing engagement with the covers, and the top portion and bottom portion of electrically conductive means are left open for appropriate electrical connection. Pre-cast electrically conductive means pre-assembled and embedded into the primary end cover provides for the efficient and economical assembly of cells of the present invention.

Electrically conductive means 52, 54 each include terminal post 34, 36 for external electrical connection of the cell. Terminal posts 34, 36 may be, and preferably are an integral part of electrically conductive means 52, 54 and are desirably pre-cast with electrically conductive means 52, 54 as a unitary member. Terminal posts 34, 36 may be made of copper.

Electrically conductive means 52, 54 are susceptible to a variety of shapes and configurations provided such shapes and configurations are capable of electrically coupling lugs of like polarity plates. For example, electrically conductive means may comprise a solid body member to which the lugs of the plates may be fused by any of the different techniques known in the art, including tungsten-inert gas (TIG) welding, inductive heating or oxyacetylene burning.

Figure 5:
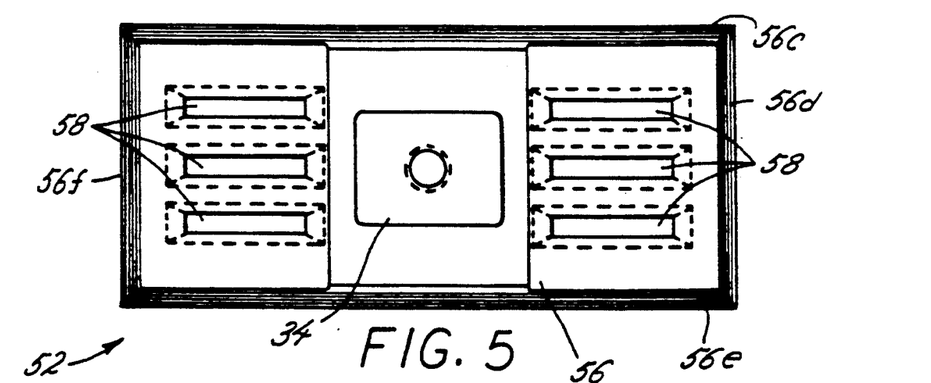
FIG. 5 is a top view, in perspective, of the electrically conductive means for the positive plates.
Figure 6:
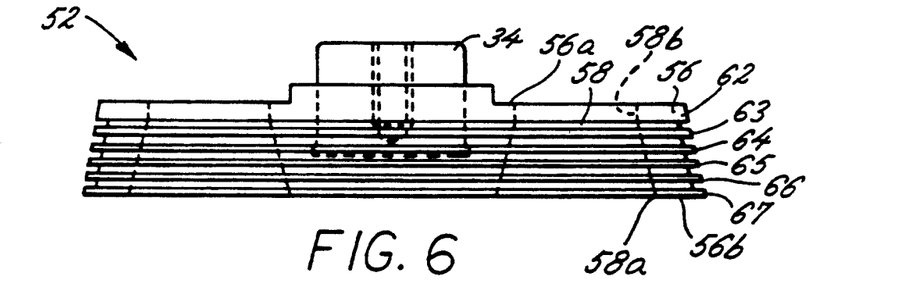
FIG. 6 is a side view, in perspective, of the electrically conductive means for the positive plates.
Figure 7:
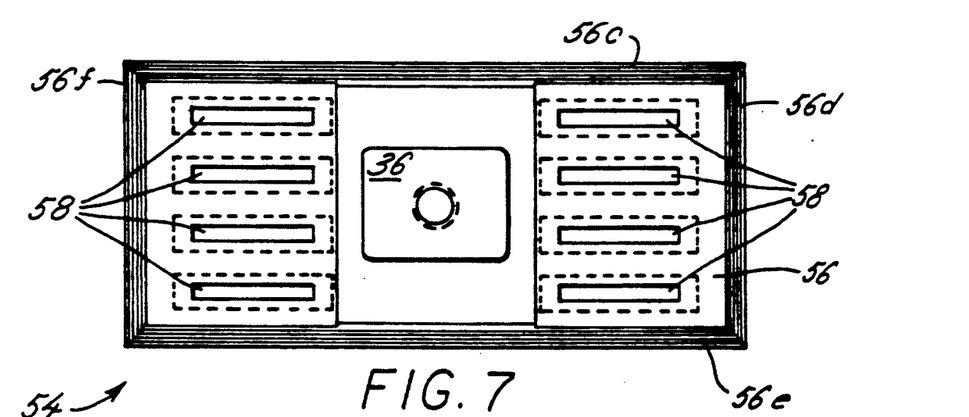
FIG. 7 is a top view, in perspective, of the electrically conductive means for the negative plates.
Figure 8:
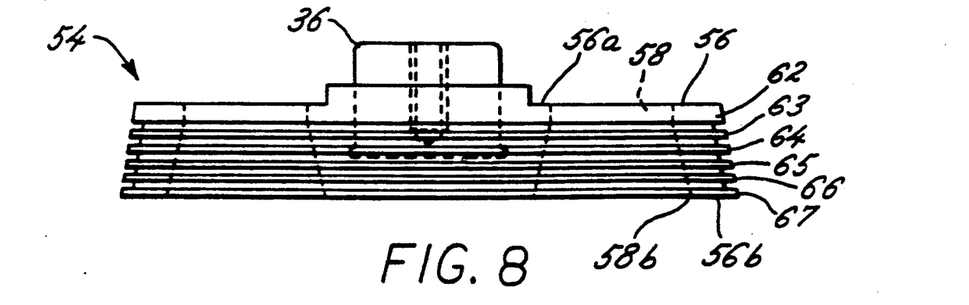
FIG. 8 is a side view, in perspective, of the electrically conductive means for the negative plates.

In the preferred embodiment as illustrated in FIGS. 5–8, electrically conductive means 52, 54 comprise a body portion 56 and a terminal post 34 or 36 formed as an integral component of the electrically conductive means. Body portion 56 of each of electrically conductive means 52, 54 includes a top 56a, a bottom 56b, and sides 56c, 56d, 56e and 56f. Body Portion 56 of electrically conductive means 52, 54 includes slots 58 therein for receiving lugs of the positive and negative plates 38, 40, respectively. FIGS. 5 and 6 illustrate electrically conductive means 52 for primary end cover 26 for positive plates 38, while FIGS. 7 and 8 illustrate electrically conductive means 54 for primary end cover 28 for negative plates 40. The construction of electrically conductive means 52, 54 is essentially the same, with the exception that in the illustrated embodiment, electrically conductive means 54, for negative plates 40 includes additional slots for the lugs of an additional negative plate in a cell stack wherein the number of negative plates are greater than the number of positive plates.

As illustrated in FIGS. 6 and 8, slots 58 in electrically conductive means 52, 54 extend from the bottom 56b of body portion 56 to the top 56a of body portion 56. Preferably slots 58 are tapered from broad 58a at the bottom 56b of body portion 56 to narrow 58b near the top 56a of body portion 56. The broad base of tapered slots 58 facilitates placement of the electrically conductive means 52, 54 on the lugs of the plates as well as placement of the primary end cover onto the end of the container. The narrow upper portion 58a of tapered slots 58 is preferably sized to fit snugly against the lugs when the primary end cover is seated onto the end of the container and the lugs extend through the slots. The snug fit of the lugs in the slots minimizes lead rundown into the plate stack when the lugs are fused to electrically conductive means. It is also preferred that body portion 56 is configured to permit the lugs on the plate to extend through the slots 58 to facilitate fusing of the lugs to electrically conductive means. Electrically conductive means may be fused to the lugs in any of a number of different ways. For example, tungsten-inert gas (TIG) welding, inductive heating, oxyacetylene burning, or the like may be used.

Preferably, the sides 56c, 56d, 56e and 56f of body portion 56 of electrically conductive means are serrated, with a plurality of serrations 62, 63, 64, 65, 66 and 67 to facilitate sealing engagement of electrically conductive means 52, 54 with the covers. For covers made of thermoplastic resin, which is preferred, the electrically conductive means may be embedded into the cover by molding the resin into the serrated sides of the electrically conductive means for a sealing and strong fit. In this manner, the pre-cast electrically conductive means are embedded into the primary end covers and the primary end cover is pre-assembled for subsequent assembly of the cell.

The grids of positive plates 38 and negative plates 40 are preferably comprised of lead or a lead alloy, and the lugs on the plates are preferably comprised of the same metal as the grids. The grids include the lugs and preferably include the tapered section as described above. The grids may be made by any of a variety of methods known to those skilled in the art. By way of example, the grids may be made by book mold casting, continuous casting, weaving or punching. The grids may also be expanded metal grids. Electrically conductive means 52, 54 are likewise preferably comprised of lead or a lead alloy.

During assembly of cell 10, primary end covers 26, 28 are sealed to ends 22, 24, respectively of container 12. At end 22, lugs 44, 46 of positive plates 38 are received by slots 58 in electrically conductive means 52 and extend through slots 58 when primary end cover 26 is seated on end 22 of container 12. Slots 58 fit snugly around the perimeter of lugs 44, 46. Preferably the portion of lugs 44, 46 that extend through slots 58 are fused to electrically couple the lugs to electrically conductive means 52. Since electrically conductive means 52 includes terminal post 34, lugs 44, 46 of positive plates 38 are in electrical communication with terminal post 34 upon electrical coupling of the lugs to electrically conductive means. End 24 may be assembled in the same way. In the assembly of cells in accordance with the present invention, the straps, post and post burn have been eliminated. The electrically conductive means provides a direct current path from the lugs to the terminal and, importantly the current path has been shortened significantly. Additionally, taller plates can be used in cells in accordance with the present invention because the need for headspace above the plates to accommodate a conventional lug to strap to post current path has been eliminated.

The orientation of the lugs of the positive polarity plates and the negative polarity plates improves the cell capacity, and it benefits cell formation and improves efficiency. Orienting the positive and negative terminals at opposite ends of the cell achieves a higher utilization of the total area of electrode active material and thereby improves capacity.

As shown in FIGS. 2, 3 and 4, positive end of cell 10, may, and preferably does, include secondary end cover 30 which engages primary end cover 26. Secondary end cover 30 may merely snap fit to primary end cover 26, or it may be sealed to primary end cover 26, or the like. It will be appreciated that it may not be necessary to seal the secondary end cover to the primary end cover because the cell may be sealed when the electrically conductive means is fused to the plate lugs. Secondary end cover 30 includes an aperture 30a therein for receiving terminal post 34. Preferably secondary end cover 30 is sized to cover electrically conductive means 52, but may be larger if desired. As illustrated in FIGS. 3 and 4, the negative end of cell 10 may likewise include a secondary end cover 32 which engages primary end cover 28. Secondary end cover 32 may merely snap fit to primary end cover 28, or it may be sealed to primary end cover 28, or the like.

To facilitate assembly of cells in accordance with the present invention, a lug alignment means 68, as shown in FIGS. 9–12, may be used for either or both of the positive and negative polarity plates. Lug alignment means 68 comprises a base member 70. Base member 70 includes apertures 72 for receiving the lugs of positive plates and negative plates. Lug alignment means 68 may be placed over the lugs of the cell element during assembly to help maintain the plates in proper alignment for electrical coupling with electrically conductive means. Lug alignment means 68 is especially useful when the lugs are to be inserted into slots in electrically conductive means. Lug alignment means 68 aligns and steadies the lugs of the plates for insertion into the slots. Preferably, apertures 72 of lug alignment means 68 are sized to produce a snug, interference fit with the lugs. Lug alignment means 68 will thus also assist in preventing lead rundown into the cell during the fusing of the lugs to electrically conductive means.

Figure 9:
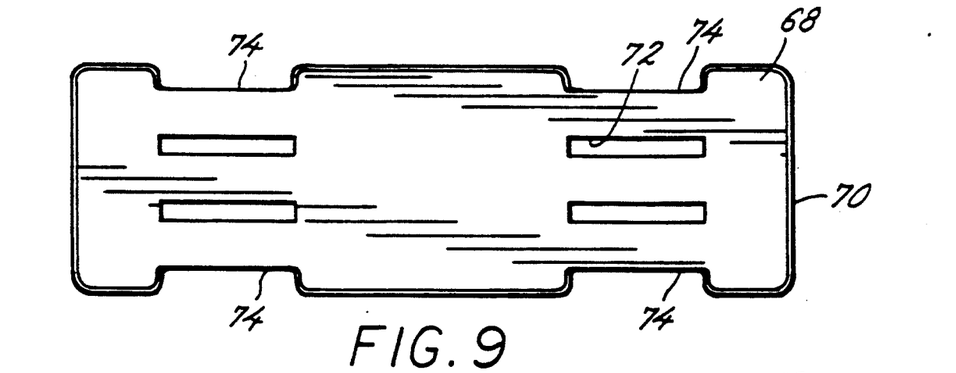
FIG. 9 is a top view, in perspective, of the lug alignment means for the negative plates.
Figure 10:
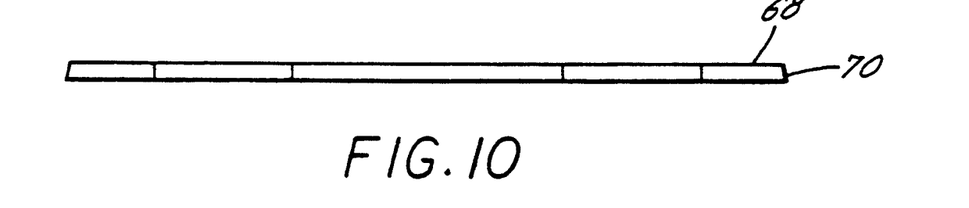
FIG. 10 is a side view of the lug alignment means illustrated in FIG. 9.
Figure 11:
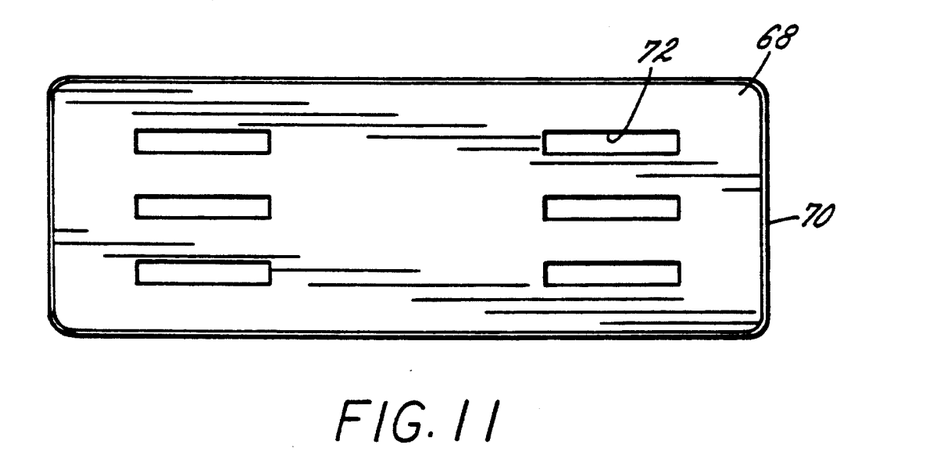
FIG. 11 is a top view, in perspective, of the lug alignment means for the positive plates.
Figure 12:
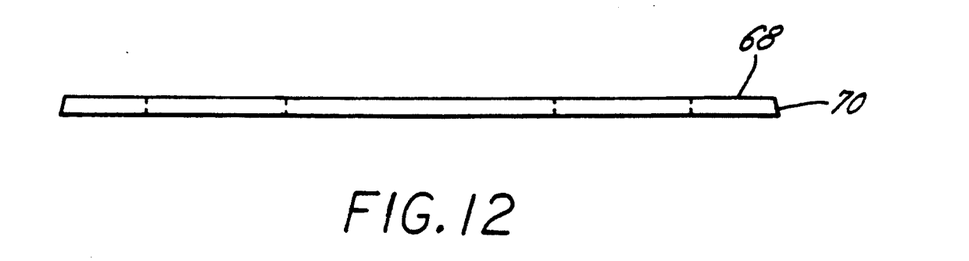
FIG. 12 is a side view of the lug alignment means illustrated in FIG. 11.

As shown in FIG. 9, lug alignment means 70 may include recesses 74 at the side edge for receiving the plates at the sides of the cell. Recesses 74 are desirable to conserve space, especially where the container is only slightly larger than the cell element.

The positive and negative grids (and lugs) may be formed from lead or a lead alloy. Any antimony-free lead alloy capable of providing a self-supporting grid may be used for the negative grid alloy. Various alloy systems are known. It is suitable to utilize, for example, lead-calcium-tin alloy in which the calcium content is from about 0.06 to 0.2% and the tin is in the range of 0.1 to 0.5%, both percentages being based upon the total weight of the alloy. Alternatively, a lead, tin, selenium alloy may be used.

In sealed lead-acid cells, it is desirable to use for the positive grid an alloy that will not cause excessive gassing, will exhibit adequate cycling performance, will be capable of deep discharge recovery, and especially for use in uninterruptible power supply applications, will exhibit a corrosion rate suitable for a twenty year life. The positive grid may comprise, for example, a lead, tin, selenium alloy, an alloy of lead, tin, selenium and other metals, such as antimony or a low-antimony lead alloy, such as that disclosed in U.S. Pat. No. 4,401,730.

The positive grids can be pasted and cured by known techniques. Positive paste density of about 3.6 to 4.3 g/cm$^3$ have been found suitable. It is believed that the paste density can be lower, if desired; and, indeed, such lower paste density should increase active material utilization. Leady, litharge and red lead oxide are equally suitable for use in making the paste. Also, other than adjustments to provide the desired density, conventional paste formulations may be employed.

The negative active material may be formed, as is known, from a leady, or litharge oxide. In oxygen recombinant cells, the density should be sufficiently low so as to increase the apparent surface area of the electrodes to provide the desired oxygen recombination reaction rate. To that end, the density is suitably in the range of about 3.6-to-4.5 g/cm$^3$.

The material used for the separators should be stable in the sulfuric acid electrolyte used, resistant to oxidation by $PbO_2$ and not release materials into the electrolyte which would deleteriously effect cell performance. Separator materials known to those skilled in the art may be used in the practice of the invention.

For sealed lead-acid cells, it is preferable that the separator material is highly porous, e.g.—at least 70 to 75%, desirably up to about 90 to 98% or so, and it should be sufficiently compressible to at least substantially conform to the changing shapes of the electrodes during assembly and service. Further, average pore diameter should be sufficiently small to prevent propagation of dendrites from the negative plate and shedding of the active material from the positive plate. The average pore diameter should, however, be sufficiently large to be easily wetted by the electrolyte and not so small as to result in unduly high internal impedance. The separator material must also be capable of wicking the electrolyte through the desired height of the separator.

Lastly, and importantly, the separator material should preferably provide, in service, a substantially uniform void volume throughout the separator. The separator thus provides sufficient void volume during normal operation to support the rate of oxygen transport necessary for the internal pressure desired for the cell. In other words, when the cell is filled with the amount of electrolyte required for normal operation, sufficient void space remains in the separator to permit the oxygen generated at the positive during the latter stages of charge to diffuse in the gaseous state to the negative and be reduced (recombined). The cell has sufficient void space in the electrolyte absorbing separator so that the oxygen diffusion rate approximately equals the rate at which the oxygen is evolved.

It is believed that the void volume of the separator material is achieved through some of the pores having their walls covered with a film of electrolyte while the central portion of the pore is free from electrolyte. Adequacy of the void volume can be determined by weight loss (water determinations made during cycling). Unduly high water loss that would impair the operation of the cell should not result if the material is suitable.

The thickness of the separator will, in general, be determined by the cell capacity and the expected operating rate for the particular application. In this respect, the separator thickness used does not materially differ from those found suitable for other types of lead-acid cells used for the particular end use application. If desired, a reinforcing member such as a scrim may be employed to reduce handling problems during assembly.

It has been found suitable to use a borosilicate glass material formed from glass microfibers and chopped strands for the separator material. Materials of this type are commercially available and have been previously utilized for sealed lead-acid cells. One such material (C. H. Dexter Division, The Dexter Corporation, Windsor Locks, Conn., "Grade X4225") that has been found satisfactory has the following typical properties: nominal thickness of 40 mils, air permeability (ASTMD 737-75) of 8.5 l/min/100 cm$^2$ at 12.7 mm. water P (Gurley Permeometer Model 4301), an average pore size of 12.6 microns and a porosity (by mercury intrusion) of 1.2 meters$^2$/gram. Another borosilicate material that has been found suitable is manufactured by Evanite Corp. This material has a density of 200 g/m$^2$ and a maximum pore size of 26 $\mu$m. Composite materials may also be suitable separators. For example, a composite of glass microfibers and synthetic fibers with or without fillers may be used provided the porosity, wicking and other useful characteristics of the separator are satisfactory for a sealed lead-acid cell.

For a given cell for a particular application, the full charge specific gravity for the electrolyte needed can be readily computed. Typically, full charge specific gravities in the range of 1.250 to 1.400 will be satisfactory, and full charge specific gravities in the range of 1.250 to 1.350 are preferred. Particular applications may make it desirable to use somewhat higher or lower acid gravities.

The formation of the pasted electrodes can be carried out by known techniques. Thus, prior to assembly in the cell container, the electrodes can be formed by conventional tank formation. When this technique is employed, the formed electrodes should be dried to remove the residual electrolyte.

Desirably, however, the unformed electrodes and separators are placed in the cell container, the necessary electrical connections made, and the primary cell covers are sealed. The negative cover is pre-assembled, while the positive primary cover includes a fill hole 27 through which the necessary electrolyte is added. Formation is then carried out using conditions suitable for conventional one-shot lead-acid formation. The fill hole is then capped and ultrasonically sealed and valve 29 is put in service position. It may be useful, however, to employ somewhat less severe formation finishing conditions than those conventionally used.

Figure 3A:
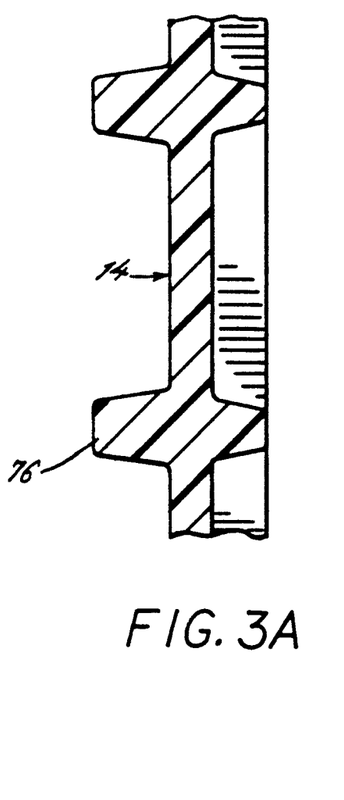
FIG. 3A is an enlarged sectional view of the ribbing in the cell container taken along line 3A—3A of FIG. 3.

Cell container 12 may be comprised of any material that is compatible with the electrochemical reactions that will occur within the cell during the charge/discharge cycle and that will not degrade in the presence of the electrolyte. Suitable materials include glass, and thermoplastic resins such as polypropylene, polyethylene and polycarbonates. Preferably, container 12 is a high strength, flame retardant recyclable material that will maximize volume efficiency and thermal management characteristics of the cell. Preferably container 12 is comprised of a modified polyphenylene oxide resin such as Noryl ®, made by General Electric Corporation. In addition, container 12 preferably includes ribs 76 on its sides 14 and 18 as shown in FIG. 3A to assist in the thermal management of the cells. Ribs 76 increase the surface area of the container to assist in heat distribution, and, particularly when several cells are stacked or placed in close proximity to one another, the ribs provide spacing through which air may flow to assist cooling the cells.

The present invention thus provides a sealed lead-acid cell which includes a novel lug and end cover assembly which enhances cell performance. The direct current path from the lugs to the terminal post through the electrically conductive means eliminates the strap, post, and post burn. Internal resistance is thus reduced and capacity is increased. Head space is also reduced, so taller plates may be used, which in turn increases the capacity of the cell for a cell of a predetermined size.

We claim:

1. A sealed lead-acid cell comprising a container having two opposite ends, a plurality of positive and negative polarity plates alternately interleaved with one another, each of said plates comprising a grid having at least one lug thereon, the lugs of said positive polarity plates and of said negative polarity plates disposed to opposite ends of said container, a primary end cover for each end of said container in sealing engagement with the end of said container, each of said primary end covers including electrically conductive means for electrically coupling the lugs of like polarity plates, and said electrically conductive means being in electrical communication with a terminal post.

2. The sealed lead-acid cell of claim 1 wherein said electrically conductive means for electrically coupling said positive plates is embedded in its respective primary cover.

3. The sealed lead-acid cell of said 1 wherein said electrically conductive means for electrically coupling said negative plates is embedded in its respective primary cover.

4. The sealed lead-acid cell of claim 2 wherein said electrically conductive means for electrically coupling said negative plates is embedded in its respective primary cover.

5. The sealed lead-acid cell of claim 2 wherein said electrically conductive means includes a terminal post as an integral component.

6. The sealed lead-acid cell of claim 4 wherein said electrically conductive means for electrically coupling the positive plates and the negative plates, respectively, is pre-assembled in each of said primary covers.

7. The sealed lead-acid cell of claim 1 wherein said positive polarity plates and said negative polarity plates each have two lugs.

8. The sealed lead-acid cell of claim 1 wherein said electrically conductive means includes slots therein for receiving the lugs of said positive and negative plates.

9. The sealed lead-acid cell of claim 8 wherein said electrically conductive means in the primary cover for the positive polarity plates is comprised of lead or a lead alloy, the lugs of the positive plates are received by the slots in the electrically conductive means, and the lugs are fused to electrically couple the lugs and the electrically conductive means.

10. The sealed lead-acid cell of claim 8 wherein said electrically conductive means in the primary cover for the negative polarity plates is comprised of lead or a lead alloy, the lugs of the negative plates are received by the slots in the electrically conductive means and the lugs are fused to electrically couple the lugs and the electrically conductive means.

11. The sealed lead-acid cell of claim 7 wherein said electrically conductive means in each of said primary covers includes slots therein for receiving the lugs of said positive and negative polarity plates.

12. The sealed lead-acid cell of claim 7 wherein said electrically conductive means in the primary cover for the positive polarity plates is comprised of lead or a lead alloy, the lugs of the positive plates are received by the slots in the electrically conductive means, and the lugs are fused to electrically couple the lugs and the electrically conductive means.

13. The sealed lead-acid cell of claim 11 wherein said electrically conductive means in the primary cover for the negative polarity plates is comprised of lead or a lead alloy, the lugs of the negative plates are received by the slots in the electrically conductive means and the lugs are fused to electrically couple the lugs and the electrically conductive means.

14. The sealed lead-acid cell of claim 8 wherein said electrically conductive means for both the positive and negative polarity plates is comprised of lead or a lead alloy, the lugs of the positive plates and the lugs of the negative plates are received by the slots of their respective electrically conductive means and the lugs of the positive and negative polarity plates are fused to their respective electrically conductive means to electrically couple the lugs and said means.

15. The sealed lead-acid cell of claim 11 wherein said electrically conductive means for both the positive and negative polarity plates is comprised of lead or a lead alloy, the lugs of the positive plates and the lugs of the negative plates are received by the slots of their respective electrically conductive means and the lugs of the positive and negative polarity plates are fused to their respective electrically conductive means to electrically couple the lugs and said means.

16. The sealed lead-acid cell of claim 4 wherein said electrically conductive means in the primary cover for the positive polarity plates is comprised of lead or a lead alloy, the lugs of the positive plates are received by the slots in the electrically conductive means, and the lugs are fused to electrically couple the lugs and the electrically conductive means.

17. The sealed lead-acid cell of claim 5 wherein said electrically conductive means in the primary cover for the positive polarity plates is comprised of lead or a lead alloy, the lugs of the positive plates are received by the slots in the electrically conductive means, and the lugs are fused to electrically couple the lugs and the electrically conductive means.

18. The sealed lead-acid cell of claim 6 wherein said electrically conductive means in the primary cover for the positive polarity plates is comprised of lead or a lead alloy, the lugs of the positive plates are received by the slots in the electrically conductive means, and the lugs are fused to electrically couple the lugs and the electrically conductive means.

19. The sealed lead-acid cell of claim 15 wherein at least one of said primary covers includes a normally closed safety release valve capable of venting gases from the cell before pressure within the cell exceeds a predetermined level.

20. The sealed lead-acid cell of claim 15 wherein a separator is included between the positive polarity plates and the negative polarity plates, said separator material being at least 70% porous, easily wetted, and capable of absorbing electrolyte.

21. The sealed lead-acid cell of claim 20 wherein the separator is a member selected from the group consisting of a borosilicate glass material and a composite of glass and synthetic fibers.

22. The sealed lead-acid cell of claim 15 wherein said cell includes a lug alignment means for either or both the positive and negative polarity plates, said lug alignment means comprising a base member having apertures therein for receiving the plate lugs, said apertures being tapered inwardly from the bottom of the base member to the top of the base member.

23. The sealed lead-acid cell of claim 22 wherein the apertures of said lug alignment are sized to produce a snug, interference fit around the lugs.

24. The sealed lead-acid cell of claim 15 wherein said container is comprised of a modified polyphenylene oxide resin.

25. The sealed lead-acid cell of claim 24 wherein said container includes ribs on the sides thereof.

26. The sealed lead-acid cell of claim 25 wherein said ribs are on a bias relative to the ends of said cell.

27. A lead-acid battery comprising a plurality of sealed lead-acid cells according to claim 1 said cells being electrically coupled together.

28. The lead-acid battery of claim 27 wherein said cells are electrically coupled with a connector means of a uniform size.

29. The lead-acid battery of claim 28 wherein said cells are connected in series.

30. The lead-acid battery of claim 28 wherein said cells are connected in parallel.

31. A lead-acid battery comprising a plurality of sealed lead-acid cells according to claim 16 said cells being electrically coupled together.

32. A lead-acid battery comprising a plurality of sealed lead-acid cells according to claim 17 said cells being electrically coupled together.

33. A lead-acid battery comprising a plurality of sealed lead-acid cells according to claim 18 said cells being electrically coupled together.

34. A maintenance-free, absorbed electrolyte lead-acid cell capable of enduring deep discharge and rapid recharging with long cycle life, comprising
a container normally sealed from the atmosphere in service, said container having two ends, each one of said container ends having a primary end cover;
a plurality of positive polarity plates and negative polarity plates alternately interleaved with one another in said container, each of said positive polarity plates comprising a grid having at least one lug extending from the grid, said positive polarity plates being disposed in said container so that the lugs of the positive polarity plates face toward one end of said container, said positive polarity plates including positive active material on said grid;
each of said negative polarity plates comprising a grid having at least one lug extending from the grid, said negative polarity plates being disposed in said container so that the lugs of the negative polarity plates face toward a second end of said container, said negative polarity plates having negative material on said grid;
sulfuric acid electrolyte in an amount sufficient to provide a desired capacity;
separator material intimately contacting and separating said positive and negative polarity plates; and said electrolyte being substantially completely absorbed in said plates and separators; and
said primary end covers for the positive polarity plates and for the negative polarity plates including an electrically conductive means for electrically coupling the lugs of like polarity plates and including a terminal post for said plates, said primary end covers being in sealing engagement with said container.

35. The cell of claim 34 wherein said cell includes a secondary end cover for each end of said container in engagement with the primary end cover and having an aperture therein through which the terminal post extends.

36. The lead-acid cell of claim 34 wherein said electrically conductive means for said positive plates is embedded in said primary end cover.

37. The lead-acid cell of claim 34 wherein said electrically conductive means for said negative plates is embedded in said primary end cover.

38. The lead-acid cell of claim 36 wherein said electrically conductive means for said negative plates is embedded in said primary end cover.

39. The lead-acid cell of claim 38 wherein said electrically conductive means each includes a terminal post as an integral component.

40. The lead-acid cell of claim 39 wherein said electrically conductive means for electrically coupling the positive plates and the negative plates, respectively, is pre-assembled in each of said primary end covers.

41. The lead-acid cell of claim 34 wherein said container includes ribs on the sides thereof.

42. The sealed lead-acid cell of claim 1 wherein said cell comprises a secondary end cover for each end of said container for covering said electrically conductive means.

43. The sealed lead-acid cell of claim 5 wherein said cell comprises a secondary end cover for each end of said container for covering said electrically conductive means.

44. The sealed lead-acid cell of claim 14 wherein said cell comprises a secondary end cover for each end of said container for covering said electrically conductive means.

45. The sealed lead-acid cell of claim 15 wherein said cell comprises a secondary end cover for each end of said container for covering said electrically conductive means.

46. The sealed lead-acid cell of claim 17 wherein said cell comprises a secondary end cover for each end of said container for covering said electrically conductive means.

47. The sealed lead-acid cell of claim 22 wherein said cell comprises a secondary end cover for each end of said container for covering said electrically conductive means.

* * * * *

UNITED STATES PATENT AND TRADEMARK OFFICE
CERTIFICATE OF CORRECTION

PATENT NO. : 5,227,266
DATED : July 13, 1993
INVENTOR(S) : David M. Shaffer et al It is certified that error appears in the above-indentified patent and that said Letters Patent is hereby corrected as shown below:

Column 1, line 2 in the title, "NOVEL" should be inserted before "SEALED".

Column 11, line 51, delete "said" and substitute therefor --claim--.

Signed and Sealed this

Thirty-first Day of May, 1994

Attest:

BRUCE LEHMAN

Attesting Officer        Commissioner of Patents and Trademarks